United States Patent Office 3,370,996
Patented Feb. 27, 1968

3,370,996
POLYURETHANE ELASTOMER
Hyman R. Lubowitz, Redondo Beach, Charles J. Rogers, Placerville, and Raymond A. Lynch, Rancho Cordova, Calif., assignors to the United States of America as represented by the Secretary of the Air Force
No Drawing. Original application May 28, 1964, Ser. No. 371,156. Divided and this application Apr. 25, 1966, Ser. No. 545,807
4 Claims. (Cl. 149—20)

ABSTRACT OF THE DISCLOSURE

A polyurethane elastomer constituent reaction product within a $10^{-5}$ mm. Hg vacuum at 300–385° F. from 3 to 5 hours, 6 to 7 equivalents of polyoxytetramethylene sebacate with 3 to 4 equivalents of a polyoxytetramethylene glycol such as polyoxypropylene glycol adduct of 1,2,6-hexanetriol with 10.7 equivalents of toluene diisocyanate with 0.02 weight percent of ferricacetylacetonate and with or without 10 weight percent of $ZnO_2$ and the product is cured at 110° F.

---

This application is a division of application Ser. No. 371,156, filed May 28, 1964.

This invention relates to new and improved polyesters used as binders in the making of solid propellants, in liners for rocket motors, as a foam, and the like, and to the process by which the polyesters are made.

The objects of the present invention are the provision of a method for making a polyurethane elastomer of new and improved physical and chemical properties and characteristics, and the products that result from following the process.

The process here of interest is for preparing polyesters by heating a polyoxytetramethylene glycol with an organic acid that, preferably, contains two esterifiable carboxyl groups, or a corresponding acid anhydride, and mixtures thereof.

The polyesters of this invention are made according to the general reaction:

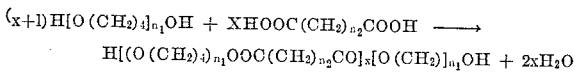

wherein:

$x$ = moles of constituents;
$n_1$ varies between 10 and 15; and
$n_2$ varies between 1 and 40.

Illustratively where $x$ is 1, $n_1$ is 10, and $n_2$ is 1, the above equation reads:

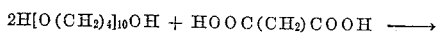
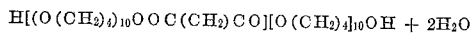

and where $x$ is 1, $n_1$ is 15, and $n_2$ is 40, the equation reads:

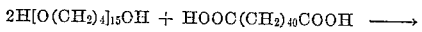
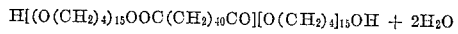

Polyoxytetramethylene glycol examples are selected from the group that consists of (a) polyoxypropylene glycol adduct, of 1,2,6-hexanetriol of the molecular weight 200; and (b) polyoxyethylene sorbitan monolaurate.

The organic acids that contain two esterifiable carboxyl groups, of which examples are sebacic acid; isosebacic acid that consists of a mixture of by weight about 10% sebacic acid, 80% ethyl suberic acid, and 10% diethyl adipic acid; azelaic acid; and the like. In place of the organic acid, examples of acid anhydride are succinic anhydride, dodecenyl succinic anhydride mixtures thereof and the like. The dioic acids comprise a well-established homologous series of which their anhydrides are derivatives.

The reactions indicated by the above equations occur in the presence or in the absence of a catalyst that may be selected from the group that consists of paratoluenesulfonic acid, stannic chloride, calcium acetate, barium acetate, and hydrochloric acid.

The above reaction is accomplished illustratively by placing in a flask in the respective molar ratio of from 2 to 1 to 4 to 3 of the polyoxytetramethylene glycol with a chosen dioic acid or acid anhydride, and with or without a selected catalyst. The amount of the catalyst added illustratively is about one per cent by weight of the weight of the dibasic acid content in the mixture. Where preferred, the amount of the catalyst added may be computed as being from 0.1 to 5 percent by weight of the total weight of the reactants. The atmosphere within the flask or retort is made inert by flushing thoroughly with a gas selected from the group that consists of nitrogen, carbon dioxide, helium, and ethane, maintained at a desired pressure, or in a vacuum as preferred, and at room temperature for the flushing operation.

The flask and its charge are then heated to within the temperature range of between 300° F. and 550° F., or a suggested more limited preferred range is between 350° F. and 420° F., or about 177° to 216° C.

The esterification reaction occurs preferably in the absence of a solvent or a diluent, although if desired it may occur in the presence illustratively of benzene, toluene, xylene, cyclohexane, chloroform or carbon tetrachloride. Of this group of diluents, benzene and toluene are useful azeotropic distillation agents.

The heating of the flask or retort is continued to the completion of the esterification reaction, when vacuum distillation or fractional distillation is used to isolate the product. The process may be by batches or may be a continuous operation, as preferred.

EXAMPLE 1

Approximately 460 equivalent weights of polyoxytetramethylene glycol and an equal amount of sebacic or decanoic or capric acid are combined in a five liter flask that has a round bottom and that is fitted with a water-cooled condenser. This charge produces a polyester diol yield of 3000 molecular weight. One percent by weight based on the dibasic acid content of paratoluenesulfonic acid, illustratively, is added to the charge as the esterification catalyst.

The flask and its contents are heated at atmospheric pressure with stirring at 385° F. for three to four hours until about the stoichiometric amount of water is condensed in the distillate.

The pressure within the flask is then reduced to about 5 mm. Hg and the temperature of 385° F. is continued for about one hour until the acid number drops below 1.00.

The product of the reaction is a clear, golden liquid that has the properties: hydroxyl number 37.08; acid number 0.80; 0.044% by weight $H_2O$; viscosity cs./73° C. 1038; and molecular weight 2960.

EXAMPLE 2

The usefulness of the polyesters that are contemplated hereby is illustrated by their addition as binders to solid propellants.

Two 50-pound batches are prepared of polyurethane propellant that contain 80% by weight of solids, no plasticizer, and binders that were formulated with 0.15 and 0.35 diol equivalents of polyoxytetramethylene sebacate diol of about the molecular weight 2000, as the polyester that embodies the present invention.

The former 0.15 diol equivalent polyester propellant at 80° F. exhibits a tensile strength of 95 p.s.i. and a 21.5% elongation.

The latter 0.35 diol equivalent polyester propellant at 80° F. exhibits a tensile strength of 141 p.s.i. and an 13.6% elongation.

It is concluded from this experimentation that, with an increase of the polyester content, a 48.5 increase in tensile strength is effected with a relatively small loss of elongation.

The former propellant of 0.15 diol equivalent is also formulated with diisooctylazelate as a plasticizer.

The complete propellant is:

| | Percent by weight |
|---|---|
| $NH_4ClO_4$ | 63.50 |
| Aluminum | 16.50 |
| Phenyl-beta-naphthylamine | 0.20 |
| Carbon black | 0.20 |
| Ferric acetylacetonate | 0.08 |
| Polyoxyethylene sorbitan monolaurate | 0.22 |
| Diisooctylazelate | 5.86 |
| Polyoxytetramethylene sebacate | 2.54 |
| Polypropylene glycol (molecular weight 1850) | 8.23 |
| Polyoxypropylene glycol adduct of 1,2,6-hexanetriol of molecular weight 200 | 1.16 |
| Toluene diisocyanate | 1.51 |
| | 100.00 |

The propellant of the above composition at 80° F., or 27° C., exhibits a tensile strength of 90 p.s.i. and an elongation of 36%. This propellant, in contrast to an ordinary polyurethane propellant, exhibits little loss in tensile strength upon its plasticization. This propellant exhibits a superior elongation at low temperatures, and experimentally exhibits an elongation of 42% at 0° F.; 25% at −40° F.; and 8% at −75° F.

Another propellant that is formulated with polyoxytetramethylene sebacate of a molecular weight of about 3000, in place of polyoxytetramethylene sebacate of about 2000 molecular weight, displayed a 33% elongation at 80° F. and a 14% elongation at −75° F.

The effect of polyoxytetramethylene sebacate of the molecular weight of about 3000 was compared experimentally with polyoxytetramethylene diol of about the same molecular weight in propellant batches that both contained 80% solids. The former propellant exhibited at 80° F. a 100 p.s.i. tensile strength and a 34% elongation, as compared for the latter of 127 p.s.i. tensile strength and 9.2% elongation.

It is thus seen that the ester product of polyoxytetramethylene diol in contrast with the nonesterified material, increases the elongation of polyurethane propellants by at least a factor of three.

EXAMPLE 3

The following is an example of a polyurethane elastomer that is prepared with a polyester that embodies the present invention.

| | |
|---|---|
| Polyoxytetramethylene sebacate (of molecular weight about 3000), equivalents | 7.0 |
| Polyoxypropylene glycol adduct of 1,2,6-hexanetriol (M.W. 200), equivalents | 3.0 |
| Toluene diisocyanate, equivalents | 10.7 |
| Ferric acetylacetonate, weight percent | 0.02 |

The above constituents are mixed under a vacuum of about $10^{-5}$ mm. Hg to remove absorbed gas. The mix is cast, and is cured at 110° F.

The product is a tough elastomer that displays over 1000% elongation and instantaneous recovery to its original dimension.

EXAMPLE 4

The composition of a polyurethane liner for case-bonded solid propellant rocket motors comprises:

| | |
|---|---|
| Polyoxytetramethylene sebacate (of molecular weight 3000), equivalents | 6.0 |
| Polyoxypropylene glycol adduct of 1,2,6-hexanetriol of molecular weight 200, equivalents | 4.0 |
| Toluene diisocyanate, equivalents | 10.7 |
| Ferric acetylacetonate, weight percent | 0.02 |
| $ZnO_2$, weight percent | 10 |

The above constituents are mixed to remove absorbed gas at 110° F. under a vacuum of $10^{-5}$ mm. Hg. The mix is spun onto a rocket casing and is cured at 110° F. The resultant product is a tough, elastic liner that displays excellent adhesion to propellants of which polyurethane is an example.

The polyesters of this invention are used as constituents in polyurethane elastomers, foams, propellants, liners, and the like. The resultant products in contrast with comparable products made with glycols or polyester diols, are enhanced in the properties of plasticizer compatability, elastic modulus, elastic recovery, tensile strength, extension at break, resilience, and, in the case of liners, they have an improved adhesion to the propellant.

The polyesters of the present invention yield polyurethane elastomers which, in addition, to high elasticity, display complete and instantaneous recovery. The elastomers are tough and show remarkable resistance to tear. The elastomers are compatible with plasticizers, such as diisoazelate, diethyl sebacate, bis(2,2-dinitropropyl)acetal, etc. These elastomers retain their good properties even when they are highly plasticized as, for example, where they have added thereto 50, or up to about 70 percent by weight of plasticizer.

For polyurethane foam applications of the present invention, the terminal hydroxyls of the polyesters assure reactivity with isocyanates, such as with toluene diisocyanate. The high ether oxygen content in conjunction with relatively fewer carboxyl groups contribute improved resilience and tenacity to the polyurethane foams.

Polyesters of this invention are particularly of use in polyurethane solid propellants. They increase the resilience and the toughness of the propellant product without significantly affecting its elasticity.

In comparison, the use of ordinary diols, such, for example, as ethylene glycol adipate, diethylene glycol adipate, and the like, in order to accomplish a comparable effect, markedly reduces the elastic characteristic of the propellant. A comparable effect is not accomplished by the use of polyether diols and glycols such, for example, as polyoxytetramethylene glycol, polypropylene glycol, and the like.

The polyesters of the present invention are employed as the total or partial diol constituent of binders for solid propellants. Binders for polyurethane solid propellants generally are comprised of diols such as, polypropylene glycol triols such as the polypropylene glycol adduct of hexanetriol or glycerine and diisocyanates such as toluene diisocyanate or hexamethylene diisocyanate. Such binders yield solid propellants containing 80% solids, displaying suitable elongations of 30-40 percent but with poor tensile strength of 50 to 60 p.s.i. Physical properties may be varied by varying the diol-triol ratio in the binder. Although the resultant propellant exhibits a higher tensile strength with increasing triol content, the elongation of the propellant is reduced. Thus the propellant exhibits a high modulus of elasticity and low elongation which are not desirable properties for use in large case-bonded rocket motors. By the use of the polyesters of the present invention as the total or partial diol constituent in the binders, propellants of higher strength with relatively little loss in elongation are obtained although the cross-link density of the material is not varied.

Of particular interest are the polyurethane propellants of low brittle points and suitable mechanical properties which are obtained through the use of the polyesters of the present invention. The depression of the brittle point is usually accomplished by the use of plasticizers, the effectiveness of which varies with the nature of the plasticizer and the extent of the plasticization. Ordinary propellants having marginal tensile strengths will, upon plasticization, suffer a reduction in tensile strength which renders them useless. However, polyurethane propellants based on binders containing the polyesters of the present invention can be highly plasticized up to 50–70 percent by weight of the binder content, and still display physical properties that are suitable for large, solid propellant rocket motors. This property is of particular interest when it is desired to incorporate in propellants large amounts of high energy plasticizers, such as the nitro compounds bis(2,2-dinitropropyl) acetal and bis(2,2-dinitropropyl) formal, and the like, in order to increase the specific impulse of the propellants.

Liners for rocket motors prepared with the polyesters of the present invention display excellent physical properties. Liners are formulated by incorporating 5 to 25 percent by weight of solid materials, such as, ZnO, $TiO_2$, $Fe_2O_3$, $Al_2O_3$, $ZrO_2$, etc., in the resin. The resins are fluid and are easily spun onto rocket casings. The liners are cured at moderately low temperatures of 110° F., for example, however high temperatures may be employed in order to obtain a more rapid cure. The liners are usually cured through the use of a suitable compound containing three or more hydroxyl groups and a diisocyanate. Mixtures of polyhydroxy materials or diisocyanates may be used. Suitable compounds containing two hydroxyl groups may be used in conjunction with the polyesters of the present invention. Of particular interest, liners prepared with the polyesters of the present invention exhibit better adhesion to solid propellants than ordinary polyurethane liners. Peel tests show that adhesion is improved up to a factor of four.

It is to be understood that the reactants, the reagents, the process steps and the like, that are disclosed herein, are illustrative of a successfully operative embodiment of the present invention and that modifications may be made therein without departing from the spirit and the scope of the present invention.

We claim:
1. The polyurethane elastomer constituent that comprises reaction product of 7 equivalents of polyoxytetramethylene sebacate, 3 equivalents of polyoxypropylene glycol adduct of 1,2,6-hexanetriol, 10.7 equivalents of toluene diisocyanate, and 0.02 weight percent ferric acetylacetonate and curing the reaction product.

2. The polyurethane elastomer constituent that comprises the reaction product of the proportion of 6 equivalents of polyoxytetramethylene sebacate, 4 equivalents of polyoxypropylene glycol adduct of 1,2,6-hexanetriol, 10.7 equivalents of toluene diisocyanate, 0.02 weight percent of ferric acetylacetonate and 10 weight percent $ZnO_2$.

3. The polyurethane elastomer defined in the claim 1 mixed and then exhausted of objectionable environmental materials under a vacuum of about $10^{-5}$ mm. Hg to remove absorbed gases, within the temperature range of from 300° F. to 550° F. in accomplishing the reaction product and curing the product at about 110° F.

4. The polyurethane elastomer propellant containing diisooctylazelate as a plasticizer having the composition:

| | Percent by weight |
|---|---|
| $NH_4ClO_4$ | 63.50 |
| Aluminum | 16.50 |
| Phenyl-beta-naphthylamine | 0.20 |
| Carbon black | 0.20 |
| Ferric acetylacetonate | 0.08 |
| Polyoxyethylene sorbitan monolaurate | 0.22 |
| Diisooctylazelate | 5.86 |
| Polyoxytetramethylene sebacate | 2.54 |
| Polypropylene glycol (molecular weight 1850) | 8.23 |
| Polyoxypropylene glycol adduct of 1,2,6-hexanetriol of molecular weight 200 | 1.16 |
| Toluene diisocyanate | 1.51 |
| | 100.00 |

References Cited

UNITED STATES PATENTS

| 3,141,294 | 7/1964 | Lawrence et al. | 149—19 |
| 3,245,849 | 4/1966 | Klager et al. | 149—19 |
| 3,265,761 | 8/1966 | Havlik et al. | 149—19 X |

CARL D. QUARFORTH, *Primary Examiner.*

L. A. SEBASTIAN, *Assistant Examiner.*